(12) United States Patent
Reiser

(10) Patent No.: US 9,506,511 B2
(45) Date of Patent: Nov. 29, 2016

(54) DISK BRAKE, IN PARTICULAR FOR UTILITY VEHICLES, AND SEAL OF A DISK BRAKE OF SAID TYPE

(75) Inventor: Manuel Reiser, Mannheim (DE)

(73) Assignee: WABCO RADBREMSEN GMBH, Mannheim (DE)

( * ) Notice: Subject to any disclaimer, the term of this patent is extended or adjusted under 35 U.S.C. 154(b) by 571 days.

(21) Appl. No.: 13/696,584

(22) PCT Filed: Apr. 7, 2011

(86) PCT No.: PCT/EP2011/001741
§ 371 (c)(1),
(2), (4) Date: Jan. 15, 2013

(87) PCT Pub. No.: WO2011/141104
PCT Pub. Date: Nov. 17, 2011

(65) Prior Publication Data
US 2013/0126284 A1 May 23, 2013

(30) Foreign Application Priority Data

May 14, 2010 (DE) .......................... 10 2010 020 588

(51) Int. Cl.
*F16D 55/2265* (2006.01)
*F16D 65/00* (2006.01)
*F16J 3/04* (2006.01)

(52) U.S. Cl.
CPC ...... *F16D 55/2265* (2013.01); *F16D 55/22655* (2013.01); *F16D 65/0087* (2013.01); *F16D 65/0093* (2013.01); *F16J 3/042* (2013.01)

(58) Field of Classification Search
CPC .............. F16D 55/2265; F16D 55/22655; F16D 65/0087; F16D 65/0093; F16D 55/227

USPC .................... 188/370, 73.44–73.45
See application file for complete search history.

(56) References Cited

U.S. PATENT DOCUMENTS

| 4,678,064 | A | * | 7/1987 | Adachi et al. | ............. 188/73.45 |
| 4,926,979 | A | * | 5/1990 | Odaka | ............... F16D 55/22655 |
| | | | | | 188/73.44 |
| 5,036,957 | A | * | 8/1991 | Fouilleux | .......... F16D 55/22655 |
| | | | | | 188/73.1 |
| 6,609,593 | B2 | * | 8/2003 | Ishii | .................. F16D 55/22655 |
| | | | | | 188/73.44 |

FOREIGN PATENT DOCUMENTS

| DE | 20 2006 006142 U1 | 7/2006 |
| DE | 10 2008 018468 A1 | 10/2009 |
| EP | 0 381 306 A1 | 8/1990 |
| EP | 2233767 B1 * | 11/2011 |

OTHER PUBLICATIONS

Machine Translation of EP 2233767B1.*
International Preliminary Report on Patentability, mailed Nov. 29, 2012 for Application No. PCT/EP2011/001741, 8 pages.

* cited by examiner

Primary Examiner — Anna Momper
(74) Attorney, Agent, or Firm — Schwabe, Williamson & Wyatt, P.C.

(57) ABSTRACT

The invention relates to a disk brake, in particular for utility vehicles, having a carrier, a caliper, a holder device for displaceably holding the caliper on the carrier, a seal which is fixed in a recess on the holder device, and a pretensioning device for pretensioning the seal in the recess, wherein the pretensioning device is activated by the mounting of the holder device.

15 Claims, 3 Drawing Sheets

DISK BRAKE, IN PARTICULAR FOR UTILITY VEHICLES, AND SEAL OF A DISK BRAKE OF SAID TYPE

CROSS REFERENCE TO RELATED APPLICATIONS

The present application is a 35 U.S.C. §371 national phase entry application of, and claims priority to, international Patent Application No. PCT/EP2011/001741, filed Apr. 7, 2011, which claims priority to German Patent Application No. DE102010020588.5, filed May 14, 2010, the disclosures of which are hereby incorporated by reference in their entirety for all purposes.

TECHNICAL FIELD

The invention relates to a disk brake, in particular for utility vehicles, with a carrier, a caliper, a holding device for displaceably holding the caliper on the carrier, a seal fastened in a recess on the holding device and with a (pretensioning device for pretensioning the seal in the recess.

BACKGROUND

FIG. 1 shows such a disk brake in a partially sectioned view. It is possible to recognize a brake caliper 1 comprising a brake disk, which brake caliper is held in an axially displaceable manner on a stationary carrier 2 by two holding devices, whereby the holding devices each comprise a guide bolt 3 fastened indirectly or directly on the carrier 2 and extending away from the brake disk, which bolt contacts the brake caliper 1 indirectly or directly in an opening in the manner of a sleeve bearing. An encasing seal 4 in the form of a bellows is provided in the area between the brake caliper 1 and the carrier 2.

FIG. 2 shows a traditional solution for attaching the seal 4. According to it, the seal is held on the one hand on the guide bolt 3 and on the other hand on the brake caliper, preferably in its guide opening. The holding areas surround in an annular manner. In particular, the free holding on the outer circumference of the guide bolt must be tight in order to ensure the sliding function of the brake caliper on the guide bolt. To this end an annular cord is provided that is elastic and pretensions the seal exclusively in the radial direction. An inwardly facing sealing bead lies in a recess of the guide bolt, which recess is designed as an annular groove. This realizes the positioning. The guide bolt 3 is supported non-positively and positively in a flange area of the carrier 2 and fastened by a cylindrical screw 5, cf. FIG. 1.

In order that the required pretensioning in the radial direction and the positioning are secured for the seal holding, a loose ring is placed above the support area in a recess of the holding sleeve serving as seal in accordance with the traditional solution according to FIG. 2. The ring is a separate additional part.

DE-OS 10 2008 018 468 shows another traditional solution with a separate additional part in the form of a set-on holder. The holder acts radially inward.

The above solutions have the disadvantage that an additional structural part is required to fix the annularly circumferential sealing area. In addition to the expenses for the additional part and the increased assembly expense and the danger that the sealing area can be damaged during the attaching of the separate additional part, the seal can also come loose, e.g., if the additional part separates from the elastomeric seat when used in the field and therefore the required clamping pretension in the radial direction is lost. As a consequence, leaks then occur that adversely affect the sliding function of the brake caliper opposite the guide bolt.

Another disadvantage can be seen in that the contact area between the guide bolt and the flange area of the carrier is unprotected for the non-positive and the positive fit and tends to be susceptible to corrosion.

The invention has the task of further developing the disk brake of the initially cited type in such a manner that the sealing is improved economically as well as functionally. Furthermore, the seal itself should also be improved in this regard.

According to the invention the task posed for a disk brake of the initially cited type is solved in that the pretensioning device reacts to the placing of the holding device.

In other words, an "automatic action" is provided in accordance with the invention in that the placing of the holding device is sufficient to pretension the seal in the recess. Therefore, a separate assembly step for producing the pretension is eliminated, which has economic and functional advantages.

According to the invention the holding device is preferably attached to the carrier, whereby the pretensioning device is constructed on the carrier. Thus, this expressly includes an embodiment in which the pretensioning device is constructed in one piece with the carrier.

According to the invention the holding device can be designed in principle as desired. It is preferably a guide bolt. Furthermore, the guide bolt functioning as holding device is preferably held by a cylindrical screw on the carrier, whereby this preferably takes place in a non-positive and positive connection via a flange area serving as pilot. This has the advantage that e tightening no screwing of the guide bolt with a disadvantageous distortion of the sealing area takes place. Another advantage results from the direct forming of the pretensioning device on the carrier with a contacting of the seal, as a result of which even the support area of the guide bolt is protected against environmental influences.

It is again true for the pretensioning device that it can be designed in principle as desired. However, it is preferably provided in accordance with the invention that it pretensions the seal in the direction of the depth of the recess as well as in the direction transverse to the direction of depth. As a result, the effective sealing surface becomes especially great.

Furthermore, the recess (preferably has in accordance with the invention a rectangular or a U-shaped contour. In this instance the pretensioning in the direction of depth brings about a pressing of the seal on the bottom of the rectangle or of the "U", in contrast to which the pretensioning in the direction transverse to the direction of depth brings about a pressing of the seal on the lateral limit of the rectangle or of the "U".

According to the invention it is furthermore preferred that the recess runs around the holding device in an annular manner. In this manner an especially reliable seal of this area can be achieved in that the sliding displacement of the caliper takes place relative to the carrier.

An especially preferred embodiment of the invention provides that the pretensioning device has a control surface that presses against the seal. This design can be realized in an especially simple manner.

The control surface is furthermore preferably annular and has a conical or trumpet-like contour. In particular, a reliable generation of pretensioning forces in the direction of the depth of the recess as well as in the direction transverse to the direction of depth can be achieved with this design.

In order to further increase the seating effect the invention can provide that the seal rests with at least one sealing lip and/or a bead on the bottom of the recess.

Furthermore, the seal preferably has a bead on its side facing away from the bottom of the recess, Such a bead proved to be especially advantageous as regards the striven-for sealing effect.

Furthermore, according to the invention the seal is preferably shaped like a hose. In particular, it is constructed like a bellows in order to also ensure the necessary longitudinal changeability in view of the displaceability of the caliper. The bellows preferably consists of an elastomeric material.

Furthermore, according to the invention the seal preferably has a bead for fastening on the caliper, which bead projects into a recess on the caliper. This design is again especially favourable because it requires no additional structural parts.

Furthermore, the bead projecting into the recess on the caliper preferably rests with at least one sealing tip on the bottom of the recess and/or with at least one sealing lip on a side wall of the recess. This construction serves again to ensure the striven-for sealing effect.

In addition to the disk brake described in detail above the invention also creates a seal for such a disk brake. This seal is constructed according to the above explanations.

The invention is explained in detail in the following with further details using a preferred exemplary embodiment with reference made to the attached drawings.

DETAILED DESCRIPTION OF EMBODIMENTS

Figure 1:
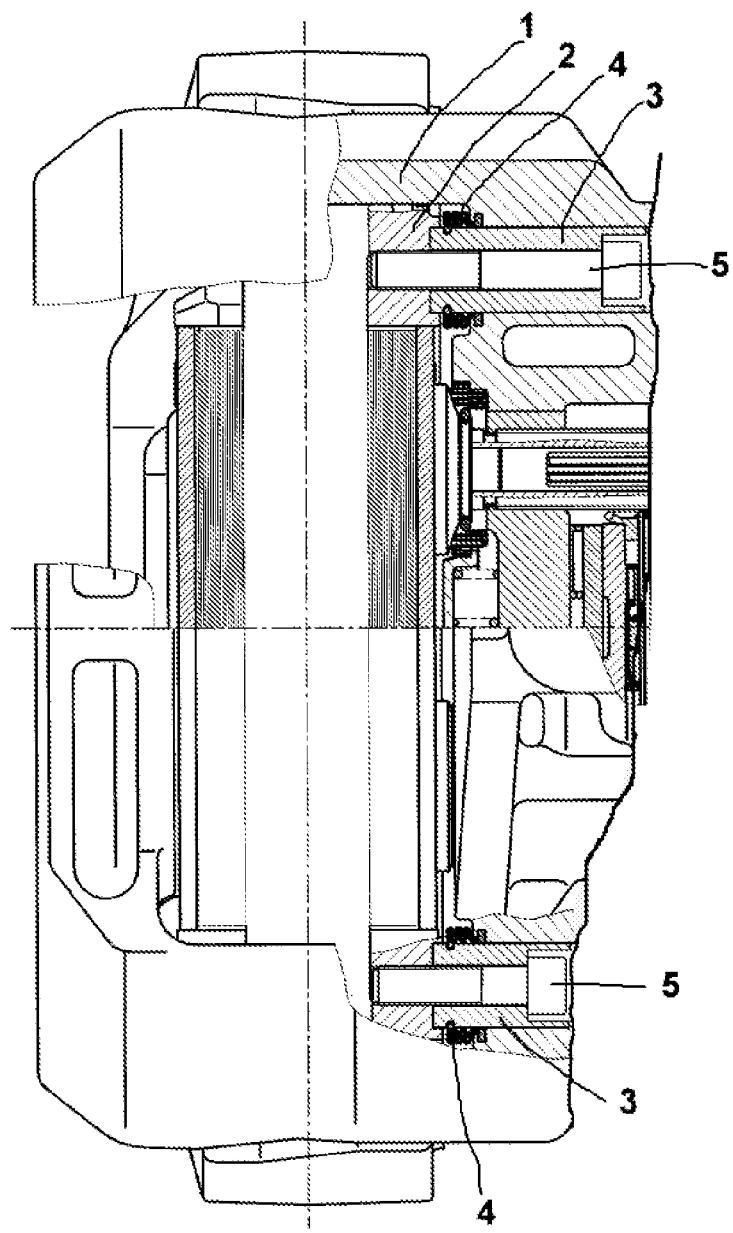
FIG. 1 shows a view in partial section of a disk brake in accordance with the prior art.

As already explained above, FIG. 1 shows a disk brake with a brake caliper 1, a carrier 2, two guide bolts 3, 3, two seals 4, 4 and two cylindrical screws 5, 5. A tightening device that is not further explained is present inside the brake caliper, which tightening device is realized in a known manner in disk brakes of utility vehicles by an eccentrically acting tightening of a rotary lever.

Figure 2:
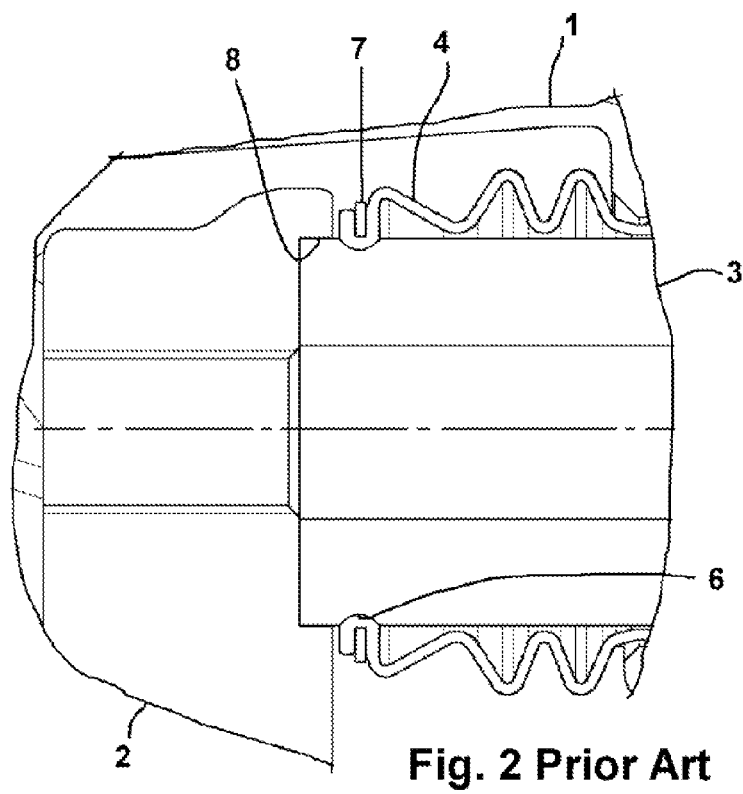
FIG. 2 shows a detailed sectional view of the brake according to FIG. 1 on an enlarged scale.
Figure 3:
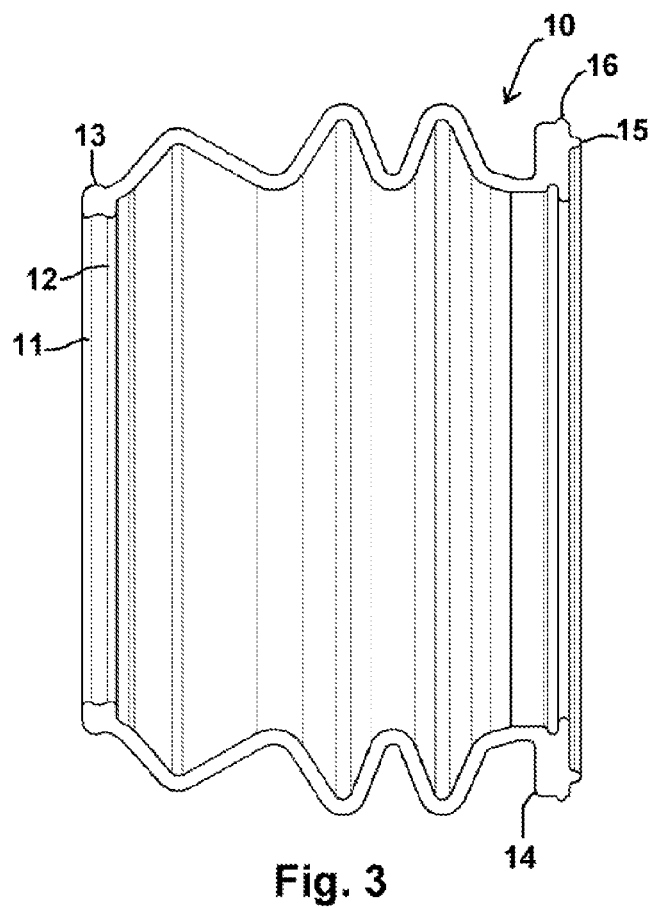
FIG. 3 shows a seal according to an exemplary embodiment of the invention.

FIG. 2 shows the fastening of the seal 4 in detail. According to it the seal 4 is placed into an annular groove 6 running around the guide bolt 3 in an annular manner. It is elastically pretensioned in the radial direction inside the annular groove 6. A ring 7 serves for security. The guide bolt 3 is inserted for the non-positive and positive locking into a flange-shape recess 8 of the carrier 2 and can be fastened by cylindrical screw 5. In FIG. 2 the cylindrical screw 5 for fastening the guide bolt 3 in recess 8 on the carrier 2 is not sketched in for the sake of clarity.

Figure 4:
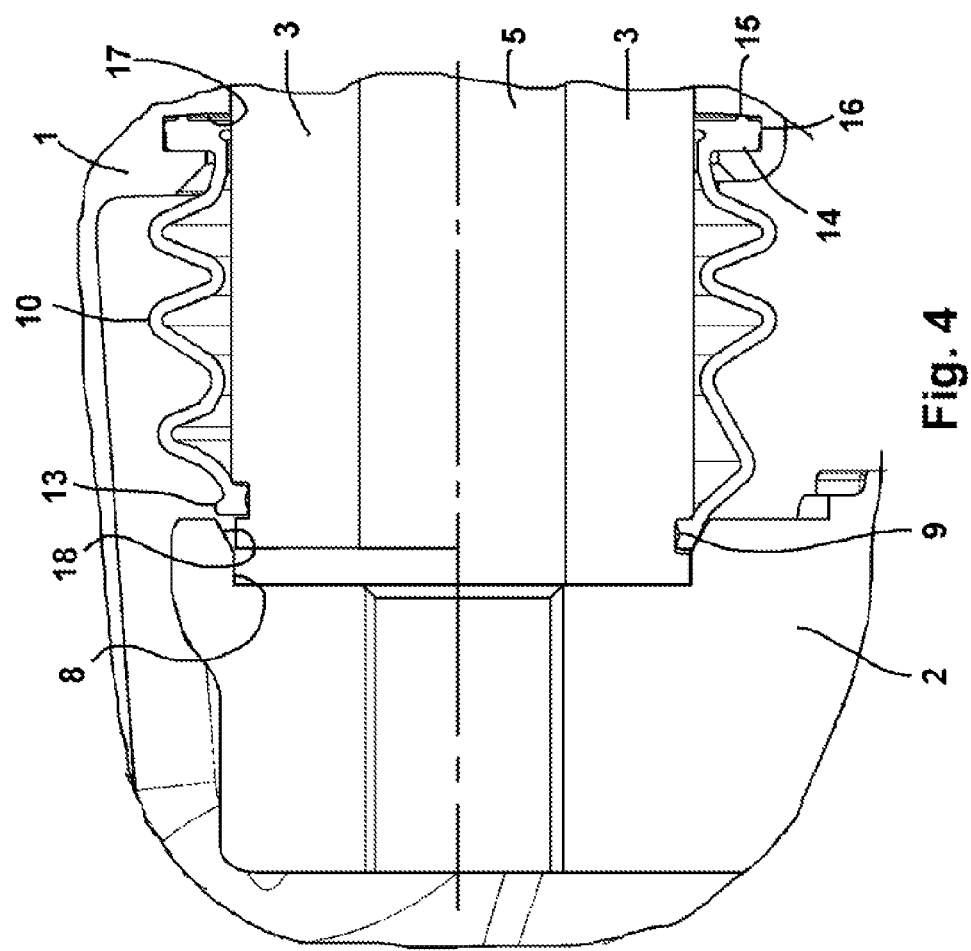
FIG. 4 shows the same view as FIG. 2 but of a disk brake according to an exemplary embodiment of the invention.

FIG. 4 shows an exemplary embodiment of the invention, namely, the unscrewed state above the central axis and the screwed state underneath the central axis. The caliper 1, the carrier 2, the guide bolt 3 and the recess 8 into which the guide bolt 3 is inserted in the presentation underneath the central axis are shown once again, in contrast to which the guide bolt is located in the presentation above the central axis in front of the recess. The support of the guide bolt 3 generally takes place opposite the carrier 2 with non-positive and positive locking and its fastening takes place with a cylindrical screw 5, in analogy with FIG. 2. It is noted here that a so-called brake carrier, or an axially integrated carrier can serve as carrier for the brake caliper, The guide bolt 3 comprises a groove 9 that is rectangular in cross section in the exemplary embodiment shown in the drawings into which groove the seal 10 is inserted. It is noted here that the annular groove can also be produced according to the invention by an offset/gradation because a securing of position also takes place with this. The seal 10 is a bellows. The elastic bellows consists of an elastomer. The part of sealing 10 projecting into the annular groove 9 has two annular sealing lips 11, 12 resting on the bottom of the annular groove 9. However, the annular sealing lips can also be replaced by a circumferential bead, which improves the compactness. An annular, circumferential bead 13 is formed on the seal 10 on the side opposite the bottom of the annular groove 9.

On the other end the seal 10 has an annularly circumferential bead 14 with two annularly circumferential sealing lips 15 and 16. The bead 14 has an approximately rectangular cross section and is placed into a rectangular annular groove 17 of the caliper 1. The two sealing lips rest on the bottom or on a side wall of the annular groove 17.

Figure 5:
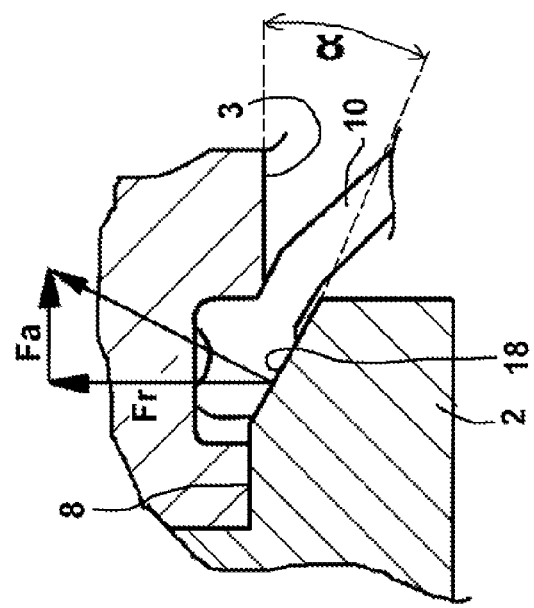
FIG. 5 shows a detailed view of a section from FIG. 4 on an enlarged scale.

The recess 8 runs out conically under formation of a control surface 18. If the guide bolt 3 is inserted into the recess 8 and fastened by the cylindrical screw 5, the control surface 18 pretensions the seal 10 inside the annular groove 12 "automatically", namely, in the direction of the depth of the annular groove 9 as well as in the direction transverse to it. In the exemplary embodiment shown in the drawings a pretension results in the radial direction of the guide bolt 3 as well as in the axial direction, cf. the forces F and $F_a$ FIG. 5. No additional structural parts and no additional assembly steps are required to produce this pretension but rather the pretension results by merely placing the guide bolt 3 on the carrier 2.

The axial and the radial pretension for the deformation of the seal can be very readily controlled by setting the angle of pitch of the control surface 18. An angle of pitch $\alpha$ in the range of 25° to 35° is preferred, especially preferably 30°. The control surface 18 should not be conically constructed here. It can also run in a trumpet shape, that is, in the form of an arc.

The rectangular form of the annular groove 9 of the guide bolt 3 is especially advantageous. As a result thereof the sealing area of the seal is pretensioned into the annular groove 9 in an especially effective manner. A special advantage of this embodiment results in that the direct contacting of the bead 13 with the control surface 18 also seals the recess 8. This results in a double sealing effect because not only the bolt guidance itself, but also the support range of the guide bolt 3 on the carrier 2 is protected. This prevents rust and contaminations from migrating underneath, which has a positive effect on the functioning and maintenance of the brake.

The features of the invention disclosed in the above specification, the eta s and the drawings can be essential individually as well as in any combinations for the realizing of the invention in its different embodiments.

The invention claimed is:

1. A disk brake, with
   a carrier having a recess;
   a caliper to be displaceably held on the carrier;
   a holding device insertable into the carrier, wherein the holding device includes an annular groove that runs around the holding device; and
   a seal to annularly cover the holding device,
      wherein the carrier further includes a pretensioning device, wherein the pretensioning device comprises a control surface extending away from the recess of the carrier, wherein the control surface is to pretension the seal into the groove of the holding device in response to insertion of the holding device into the recess of the carrier.

2. The disk brake according to claim 1, characterized in that the pretensioning device is constructed on the carrier.

3. The disk brake according to claim 1, characterized in that the holding device is a guide bolt.

4. The disk brake according to claim 1, characterized in that the pretensioning device pretensions the seal in the direction of the depth of the recess as well as in the direction transverse to the direction of depth.

5. The disk brake according to claim 1, characterized in that the recess has a rectangular or a U-shaped contour.

6. The disk brake according to claim 1, characterized in that the recess runs around the holding device in an annular manner.

7. The disk brake according to claim 1, characterized in that the pretensioning device has a control surface that presses against the seal.

8. The disk brake according to claim 7, characterized in that the control surface is annular and has a conical or trumpet-like contour.

9. The disk brake according to claim 1, characterized in that the seal rests with at least one sealing lip or a bead on the bottom of the recess.

10. The disk brake according to claim 1, characterized in that the seal has a bead on a side of the seal that is facing away from the bottom of the recess.

11. The disk brake according to claim 1, characterized in that the seal is shaped like a hose.

12. The disk brake according to claim 1, characterized in that the seal is fastened on the caliper.

13. The disk brake according to claim 1, characterized in that the seal has a bead for fastening on the caliper, which bead projects into a recess on the caliper.

14. The disk brake according to claim 13, characterized in that the bead projecting into the recess on the caliper rests with at least one sealing lip on the bottom of the recess on the caliper or with at least one sealing lip on a side wall of the recess on the caliper.

15. The disk brake according to claim 1, wherein the disk brake is to be used for utility vehicles.

* * * * *